No. 823,571.  PATENTED JUNE 19, 1906.

E. E. WHITEHEAD.

TAMPING BAR AND POST HOLE PICK.

APPLICATION FILED NOV. 25, 1905.

Witnesses
Jos. H. Blackwood
A. Randolph, Jr.

Inventor
Edward E. Whitehead
By S. A. Gowick
Attorney

_UNITED STATES PATENT OFFICE._

EDWARD E. WHITEHEAD, OF GOSHEN, INDIANA.

TAMPING-BAR AND POST-HOLE PICK.

No. 823,571.　　　　　Specification of Letters Patent.　　　　Patented June 19, 1906.

Application filed November 25, 1905. Serial No. 289,123.

_To all whom it may concern:_

Be it known that I, EDWARD E. WHITEHEAD, a citizen of the United States, residing at Goshen, in the county of Elkhart and State of Indiana, have invented certain new and useful Improvements in Tamping-Bars and Post-Hole Picks, of which the following is a specification.

My invention relates to devices used in digging post-holes, and has for its object the provision of a device having a separable handle and digging-point, said digging-point consisting of a length of angle-iron sharpened at each end and adapted to be secured to the tubular handle, the sharpened ends being adapted to be used interchangeably. The tubular handle has its free end provided with a head adapted to be used in tamping the earth around a post when in position and a lever-handle pivotally secured thereto and adapted to be used when digging post-holes to turn the device to assist in loosening the earth.

My invention will be fully described hereinafter and illustrated in the accompanying drawings, in which—

Figure 1:
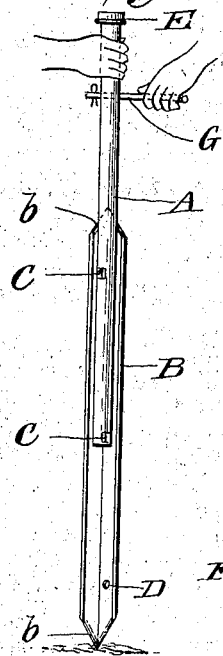
Figure 2:
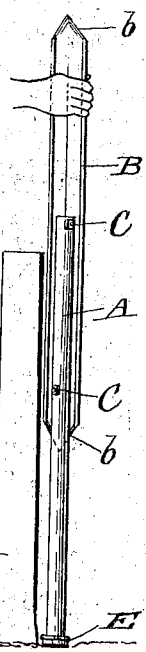
Figure 5:
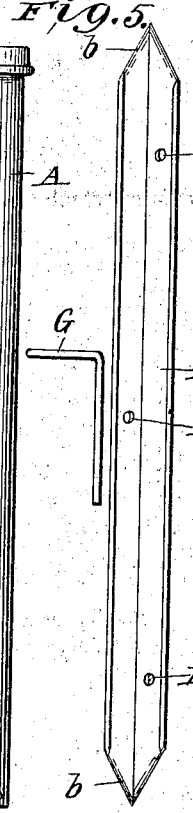
Figure 4:
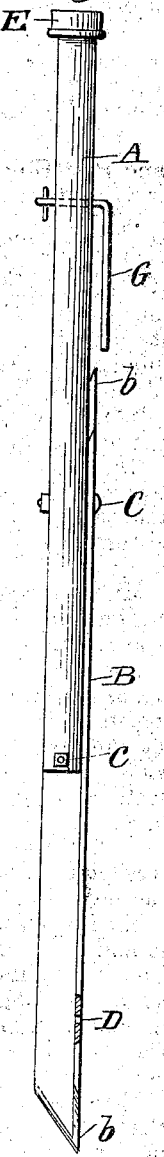
Figure 3:
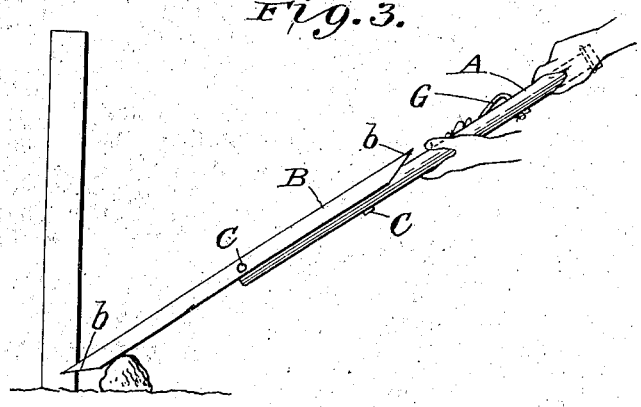

Figure 1 is a view showing my invention in use as a post-hole digger; Fig. 2, a view showing its use as a tamping-bar; Fig. 3, a view showing the device used as a lever; Fig. 4, a view showing the device on an enlarged scale, and Fig. 5 a view showing it dismembered.

In the drawings similar reference characters indicate corresponding parts throughout the several views.

My invention consists of a tubular handle A and a digging portion B, made of angle-iron, having its two ends sharpened, as shown at b. The digging portion B is secured to handle A by means of bolts C, the holes D in the portion B being so arranged that either end b may be used for digging.

E represents a knob-like head secured to the free end of handle A and adapted to be used in tamping the loose earth around the post or pole F when in position.

G represents a lever-handle pivotally secured to the handle A to be used in twisting the device on its axis to loosen the earth when the device is used as a digger.

When used as a digger, the device is held as shown in Fig. 1, the digging-point B being driven into the ground and then twisted by turning with the lever-handle G. When used as a tamping-bar, the device is reversed, as shown in Fig. 2, and the head E used to tamp or settle the earth around the post or pole after being set in position.

Having thus described my invention, what I claim is—

1. In a post-hole digger, a handle, and a reversible digging portion made of angle-iron removably and replaceably secured thereto, substantially as shown and described.

2. In a post-hole digger, a handle, a reversible digging portion removably and replaceably secured thereto, and a lever-handle pivotally secured to the handle, substantially as shown and described.

3. In a post-hole digger, a handle, a reversible digging portion made of angle-iron removably and replaceably secured thereto, and a lever-handle pivotally secured to the handle, substantially as shown and described.

4. A post-hole digger and tamping-bar comprising a handle, a removable and replaceable digging portion, having its two ends sharpened, secured to said handle, a tamping-head secured to said handle, and a lever-handle pivotally secured to the handle, substantially as shown and described.

5. A post-hole digger and tamping-bar comprising a handle, a removable and replaceable digging portion, made of angle-iron and having its two ends sharpened, secured to said handle, a tamping-head secured to said handle and a lever-handle pivotally secured to the handle, substantially as shown and described.

In testimony whereof I hereto affix my signature in the presence of two witnesses.

EDWARD E. WHITEHEAD.

Witnesses:
　ORRIN WATTS,
　HENRY BUTT.